United States Patent [19]

Lundblad et al.

[11] Patent Number: 5,031,379
[45] Date of Patent: Jul. 16, 1991

[54] MESSAGE RECEIVING ARRANGEMENT

[75] Inventors: Leif Lundblad, 122 Chaussee de Waterloo (Res: Charles V), B-1640 Rhode St Genese, Belgium; Claes Björkman, Stockholm; Tord Pettersson, Enebyberg, both of Sweden

[73] Assignee: Leif Lundblad, Rhode St. Genese, Belgium

[21] Appl. No.: 538,725

[22] Filed: Jun. 15, 1990

[30] Foreign Application Priority Data

Jun. 21, 1989 [SE] Sweden ............................ 8902243

[51] Int. Cl.⁵ .................... B65B 11/50; B65B 63/04
[52] U.S. Cl. .................................... 53/120; 53/131; 53/553; 178/37
[58] Field of Search ............. 53/120, 131, 411, 553; 178/37

[56] References Cited

U.S. PATENT DOCUMENTS

| | | | |
|---|---|---|---|
| 3,439,469 | 4/1969 | Van Mil | 53/120 |
| 3,465,492 | 9/1969 | Jensen | 53/120 |
| 3,849,968 | 11/1974 | Tateisi | 53/131 X |
| 3,973,373 | 8/1976 | Williams | 53/120 X |
| 4,202,150 | 5/1980 | Petersson | 53/206 |
| 4,701,233 | 10/1987 | Beck | 53/562 X |

FOREIGN PATENT DOCUMENTS 215864 12/1983 Japan ............................ 178/37
WO86/02799 5/1986 PCT Int'l Appl. ............. 178/37

Primary Examiner—John Sipos
Attorney, Agent, or Firm—Simmons, Perrine, Albright & Ellwood

[57] ABSTRACT

A message receiving arrangement operative to reduce the risk of uncontrolled distribution of transmitted and printed messages. The arrangement includes a sheet-store and printing mechanism for printing messages on sheets taken from the store and a supply of enveloping material intended for enveloping sheets with messages printed thereon. The arrangement also includes a closed casing (11) which functions to gather printed sheets to a collected bundle (33). Mounted in the casing (11) are means (25, 27, 30) which function to automatically envelope the thus gathered bundles of sheets.

Also mounted in the casing (11) is a folding device (29) which, during the enveloping process, is intended to move perpendicularly to the transport direction of the sheets during the gathering of the sheets to a bundle form (33). The supply of enveloping material comprises two storage rolls (25, 27) each placed on a respective side of the folding device (29) and on the opposite side of a collected sheet bundle (33) to the folding device (29) when the folding device occupies its rest position (its starting position).

2 Claims, 2 Drawing Sheets

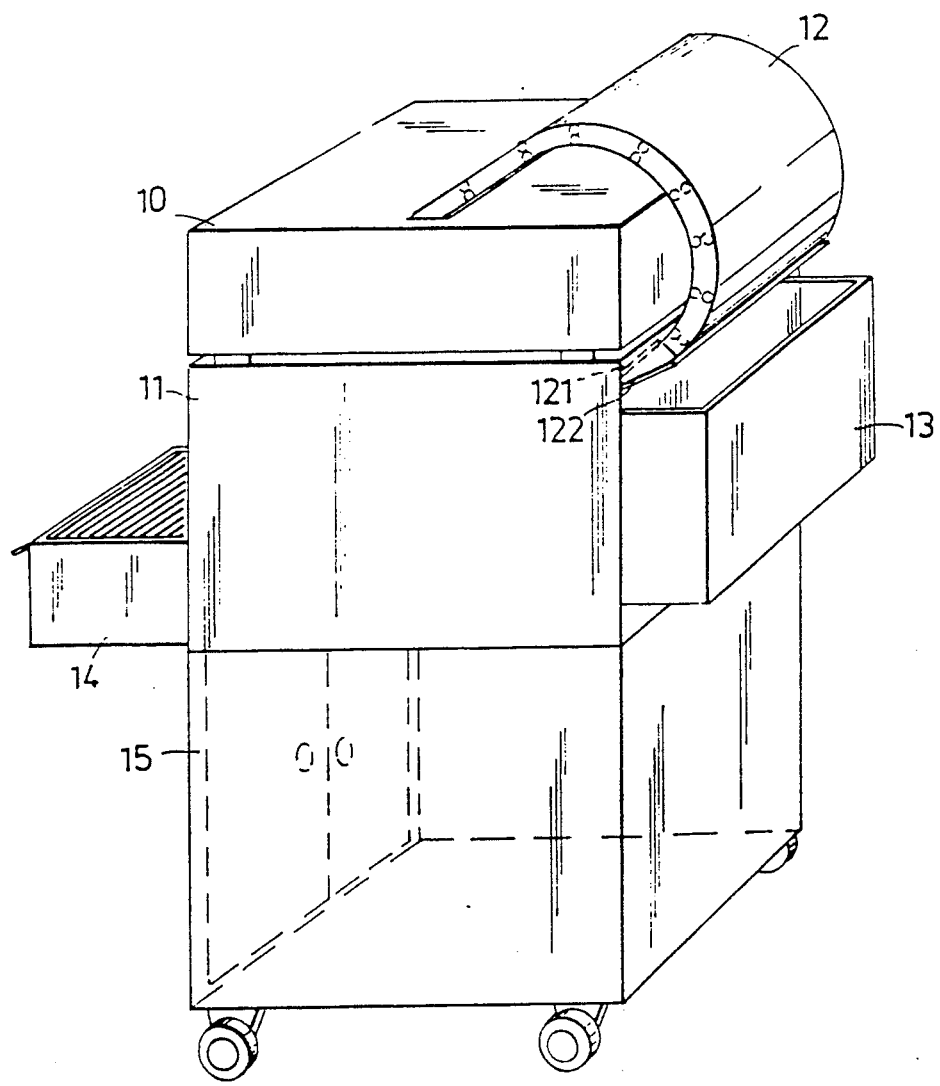

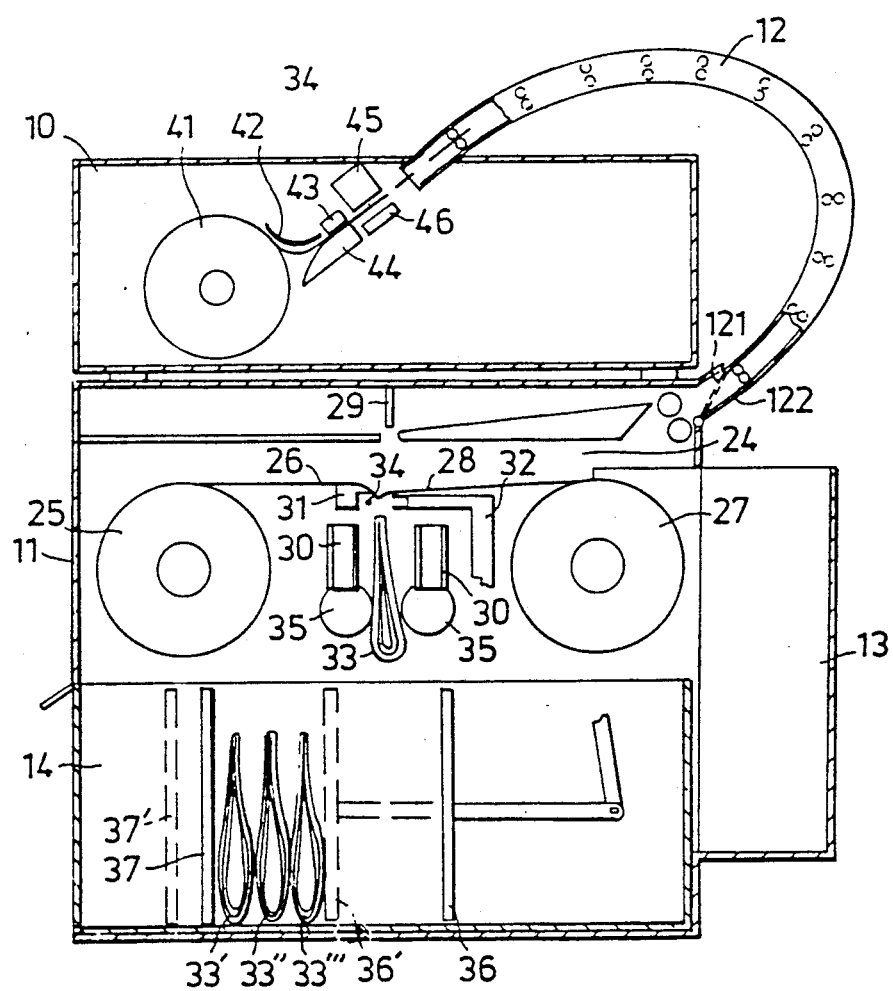

1

MESSAGE RECEIVING ARRANGEMENT

TECHNICAL FIELD

The present invention relates to an arrangement for receiving messages, said arrangement comprising a sheet store and a printing mechanism for printing messages on sheets taken from said store, and a store of enveloping material for enveloping the sheets on which said messages have been printed.

BACKGROUND ART

In the conventional transmission of messages via, for instance, telefacsimile machines, which are normally accessible to a large number of people in a working location, there is a risk that transmitted and printed messages will be distributed or otherwise dispersed in an uncontrolled fashion, which may be disadvantageous in some respects with regard to technical and business-technical relationships.

The object of the present invention is to provide improved apparatus in which this drawback is eliminated.

SUMMARY OF THE INVENTION

In accordance with the invention, the arrangement further includes a closed casing in which sheets are gathered in a collected bundle as printing is effected on said sheets, and means for enveloping the thus collected bundle of sheets with enveloping material taken from said enveloping-material store. This effectively prevents the uncontrolled disclosure of transmitted and printed messages. According to one further development of the invention, the casing has mounted therein a device for folding the bundle of sheets while simultaneously moving the bundle through a distance somewhat shorter than half the length extension of the bundle. The enveloping-material store also includes two storage rolls of enveloping material which function to feed-out material on both sides of the bundle as the bundle is moved.

These and other characteristic features of the inventive apparatus are set forth in the following claims.

BRIEF DESCRIPTION OF THE DRAWINGS

The invention will now be described in more detail with reference to the accompanying schematic drawings, in which FIG. 1 illustrates the external features of an arrangement constructed in accordance with the invention; and FIG. 2 illustrates an example of the actual bundling and enveloping process.

DESCRIPTION OF A PREFERRED EMBODIMENT

The arrangement illustrated in FIG. 1 includes a receiving apparatus 10 of a receiving subscriber.

The apparatus, which is a telefacsimile machine, includes signal receiving devices and a printing mechanism for printing the received message on a paper sheet taken from a sheet store. Such apparatus are well known and the apparatus 10 will not therefore be described in detail.

The arrangement further includes a closed casing 11 operative to gather sheets that have passed through the printing mechanism into a collected bundle as the sheets are printed, and also a store of enveloping material for enveloping the thus gathered bundles of sheets.

Located at the bottom of the closed casing 11 is a lockable box 14 in which enveloped bundles of messages are collected and from which said messages can be removed by an authorized person.

Extending between the apparatus 10 and the casing 11 is a conveyor means 12 which incorporates a switch-over device which when switched to a first position 121 will permit messages, receipts, etc. to pass to an open collecting box 13, and when switched to a second position 122 (shown in full in FIG. 1) will function to guide the printed sheets into the casing 11 and to a bundling-and-enveloping device. The switch-over device 121-122 is preferably switched between said two positions in response to a specific signal (code) sent by a transmitting device in conjunction with the transmission of a message to the receiving device. The arrangement may be such that the switch-over device will normally be located in its first position 121 and upon receipt of said specific signal is automatically switched to its second position 122 while activating the bundling device and the enveloping device at the same time. The combination of receiving apparatus 10 and casing 11 stands on a cabinet 15 such as to locate the apparatus at a suitable working height. The cabinet also provides storage means for paper sheets, enveloping material, etc.

As illustrated in FIG. 2, in addition to the receiving apparatus 10, the conveying means 12 and the closed casing 11, the inventive arrangement also includes a collecting means defining a bundling space 24, enveloping devices 25-26-27-28-29-30-31-32 and the interior of the box 14.

The sheets printed with the incoming message are conveyed by means of the conveying means 12 to the bundling space 24, with the switch-over device in the position 122. When all sheets belonging to one and the same message—or a maximum of, e.g., 40 sheets—have been collected in the space 24, the conveying means 12 is stopped and the enveloping means are activated.

The enveloping means include two rolls 25, 27 of enveloping material 26 and 28 respectively, e.g. plastic enveloping material, two guide means 31, 32 for configuring the enveloping material 26, 28 with an insertion opening for a sheet bundle 33, a vertically displaceable folding means 29, first joining means 30 which function to produce vertical joins (parallel with the plane of the paper), second joining means 32-34 which function to produce horizontal joins (perpendicular to the plane of the paper), and transport rollers 35 which function to transport the bundle of sheets 33 during the bundle-enveloping process and to the lockable box 14.

The bundling process takes places in the following manner:

When a signal (code) relating to a secret message arrives, the switch-over device 121-122 is switched to its second position 122 and the printing mechanism, the sheet-store in the apparatus 10, and the conveyor means 12 are activated.

When the message is terminated, the printing mechanism and the sheet store are deactivated and when the last sheet (optionally the 40th sheet) is fed into the bundling space (24), the switch-over device is switched to its first position 121, i.e. its normal starting position.

The enveloping process takes place in the following manner:

In the starting position, the ends of the enveloping material 26 and 28 taken from respective rolls 25 and 27 are welded together to form a horizontal join or seam. The folding device 29 begins to move vertically downwards and engages the bundle of sheets present in the space 24. These sheets are assumed to be of A4-format. The folding device continues to move vertically downwards and forces the sheets into abutment with the join interconnecting the enveloping materials 26, 28. During this continued movement of the sheets, the bundle of sheets is folded into a bundle of more or less A5-format, surrounded on both sides by plastic enveloping material 26 and 28. When this bundle comes into contact with the transport rollers 35, the folding device 29 is stopped and commences to move upwards to an intermediate position in which the bottom edge of the folding device lies immediately above the upper edge of the joining devices 30. The two joining devices 30 are displaced horizontally towards each other and form, by pressure and heat, a join or weld between the materials 26 and 28 on both sides (the edges) of the bundle enclosed between said joining devices.

When the join is complete (after some seconds), the devices 30 separate from one another and the rollers 35 transport the bundle vertically downwards through a given distance. The joining devices 30 are then again moved towards one another and again form a join on both sides of the bundle, thus over the two joins first formed. The process is repeated a third time, so that three joins are formed beneath one another on both sides of the sheet bundle. A horizontal join is then formed, which join envelopes the bundle of sheets at the top thereof and also forms a bottom for subsequent enveloping of a new bundle of sheets. This horizontal join is formed by moving the guide device 32 to the left, said guide device functioning at the same time as a joining means and the upper end of said device having a fork-like configuration, therewith entraining the two mutually adjacent plastic materials 26, 28 to the immediate vicinity of an electrically conductive, horizontal wire 34. The horizontal join is preferably formed at the same time as the uppermost vertical join is formed on both sides of the bundle by means of the joining devices 30.

When the horizontal join is complete and while the plastic-envelope is still held clamped firmly between the fork-like device 32 and the vertical anvil surface of the guide device 31, the transport rollers 35 are activated such as to separate (sever) the plastic enveloping material with the enclosed bundle from the material 26, 28 on said rolls centrally through the joins, and to transport the bundles down into the box 14.

Mounted in the box 14 is a ram system comprising a plunger 36 which prior to separation of the enveloped bundle 33 from the materials 26, 28 stored on said rolls occupies a first position (shown in full lines) to the right in the Figure, and subsequent to the bundle 33 being transported down into the box 44 is moved to a second position (shown in broken lines) 36' to the left of the Figure, and therewith transport the bundle 33 to the vicinity of other enveloped bundles 3', 33'', 33''' located in the box. A support wall 37 located to the left of the bundle collection is moved to the left (broken-line position 37') as more and more bundles of sheets are enveloped and collected in the box 14.

Prior to forming the horizontal join, the folding device 29 is returned to the starting position shown in FIG. 2 and the switch-over device 121-122 is moved to the first position (shown in broken lines) and the arrangement is again ready for bundling and enveloping the next batch of sheets. When the messages received are open messages, i.e. not secret, these messages pass directly down into the open box 13 for further distribution.

The folding device 29, the guide device (welding jaw) 32, the switch-over device 121-122 and the plunger 36 are driven via camming means by one and the same drive motor.

The rolls 25, 27, the joining devices 30 and the conveyor means 12 are driven by one and the same motor, via camming means.

Since the manner of operation and the various operational stages of the arrangement will be evident from the aforegoing, it is considered unnecessary and unsuitable to encumber the description and drawings with the various mechanical and electrical elements required to construct the arrangement in practice. From a constructional aspect, the arrangement can vary within wide limits, depending on requirements and wishes in each individual case.

The level of secrecy can be enhanced still further by providing on each side of the enveloping materials 26, 28 an opaque margin of about 50 mm in width, and by providing a specifically screen-patterned end-paper through which it is impossible to read the underlying printed sheet in the bundle of sheets.

The arrangement illustrated in FIG. 2 also includes a sheet-store in the form of a paper roll 41, a printing mechanism 43 having an anvil or counter-pressure device 44, and a cutter means 45 with anvil or counter-pressure device 46. In accordance with the invention, these units are controlled by a predetermined program, such that messages arriving on a telefacsimile line will be printed on paper taken from the roll 41. The paper is guided (by guide means 42) to the printing mechanism 43 which prints a message line-by-line. When a paper length corresponding, e.g., to a sheet of A4-format, has passed the printing mechanism, the paper length is cut to said sheet size in the cutter means 45-46 and the sheet is conveyed to the enveloping device by the conveyor means 12.

We claim:

1. A message receiving arrangement, comprising a sheet-store and a printing mechanism for printing messages on sheets taken from said store, and a store of enveloping material for enveloping sheets on which messages have been printed, characterized in that the store of enveloping material includes two storage rolls (25, 27) of enveloping material (26 and 28 respectively), the enveloping material (26, 28) having an interconnecting joined edge, and in that the arrangement also includes a closed casing (11) containing the enveloping material (26, 28), the closed casing (11) including a collecting means defining a bundling space (24) which functions to gather all sheets belonging to one and the same message into a collected bundle (33) as the sheets are printed, means (12) for conveying the printed sheets into the bundling space (24), a folding device (29) including means for folding the collected bundle (33) while forcing the bundle (33) into abutment with the interconnecting edge of the enveloping material (26, 28) and moving the folded bundle (33), the two storage rolls (25, 27) being operative to feed enveloping material (26, 28) to both sides of the folded bundle (33) during movement thereof, and means (30-31-32) for joining the enveloping material (26, 28) disposed on both sides of the folded bundle (33) adjacent outer edges of the thus gathered and folded bundle (33).

2. An arrangement according to claim 1, characterized in that the folding device (29) is arranged for movement perpendicularly to the transport direction of the sheets during gathering of the sheets to bundle form; and in that the storage rolls (25, 27) are each located on a respective side of the folding device (29) and said folding device and said storage rolls are located on opposite sides of sheets disposed in the bundling space (24) when said folding device occupies its rest position.

* * * * *